US00RE44842E

(19) United States
(12) Reissued Patent
Lester, Jr. et al.

(10) Patent Number: US RE44,842 E
(45) Date of Reissued Patent: Apr. 15, 2014

(54) LOOP MATERIAL FOR LOOP AND HOOK TYPE FASTENER USED IN A DISPOSABLE ARTICLE OR GARMENT

(75) Inventors: Donald H. Lester, Jr., Waxhaw, NC (US); Stephanie Hoyas, Tourcoing (FR)

(73) Assignees: Aplix, Inc., Charlotte, NC (US); Dounor SAS, Neuville en Ferrain (FR)

(21) Appl. No.: 13/540,165

(22) Filed: Jul. 2, 2012

Related U.S. Patent Documents

Reissue of:
(64) Patent No.: 7,960,008
Issued: Jun. 14, 2011
Appl. No.: 12/844,871
Filed: Jul. 28, 2010

(51) Int. Cl.
*B32B 3/06* (2006.01)
*B32B 3/26* (2006.01)

(52) U.S. Cl.
USPC ..... 428/99; 428/95; 428/100; 428/198

(58) Field of Classification Search
USPC ..... 428/99, 100, 95, 198
See application file for complete search history.

(56) References Cited

U.S. PATENT DOCUMENTS

| | | | | |
|---|---|---|---|---|
| 4,761,318 | A * | 8/1988 | Ott et al. | 428/85 |
| 5,256,231 | A * | 10/1993 | Gorman et al. | 156/178 |
| 5,326,612 | A * | 7/1994 | Goulait | 428/100 |
| 5,614,281 | A * | 3/1997 | Jackson et al. | 428/100 |
| 5,669,900 | A * | 9/1997 | Bullwinkel et al. | 604/391 |
| 5,763,041 | A * | 6/1998 | Leak et al. | 428/100 |
| 5,773,120 | A * | 6/1998 | Deka et al. | 428/99 |
| 5,858,515 | A * | 1/1999 | Stokes et al. | 428/195.1 |
| 5,888,607 | A * | 3/1999 | Seth et al. | 428/92 |
| 5,997,981 | A * | 12/1999 | McCormack et al. | 428/99 |
| 6,192,556 | B1 * | 2/2001 | Kikko et al. | 24/445 |
| 6,329,016 | B1 * | 12/2001 | Shepard et al. | 427/173 |
| 6,637,079 | B1 * | 10/2003 | Goulait et al. | 24/450 |
| 6,647,600 | B1 * | 11/2003 | Jost et al. | 24/442 |
| 6,770,065 | B1 * | 8/2004 | Sasaki et al. | 604/391 |
| 6,783,834 | B2 * | 8/2004 | Shepard et al. | 428/92 |
| 6,869,659 | B2 * | 3/2005 | Shepard et al. | 428/92 |
| 6,955,847 | B1 * | 10/2005 | Itou et al. | 428/174 |
| 6,969,377 | B2 * | 11/2005 | Koele et al. | 604/385.01 |
| 6,998,164 | B2 * | 2/2006 | Neely et al. | 428/86 |
| 7,008,888 | B2 * | 3/2006 | Bansal et al. | 442/364 |
| 7,078,089 | B2 * | 7/2006 | Ellis et al. | 428/138 |

(Continued)

FOREIGN PATENT DOCUMENTS

| | | | |
|---|---|---|---|
| DE | 102004053469 | A1 * | 5/2006 |
| EP | 341993 | A1 * | 11/1989 |

(Continued)

*Primary Examiner* — Cheryl Juska
(74) *Attorney, Agent, or Firm* — Hammer & Associates, P.C.

(57) ABSTRACT

A loop material for a hook and loop type fastener is a composite nonwoven. The composite nonwoven consists of a loop layer, a backing layer, and a plurality of bond regions. The loop layer may be a carded nonwoven of thermoplastic crimped staple fiber. The staple fiber may be between 1.5 to 6.0 dTEX. The loop layer may have a basis weight of between 10 and 35 g/m$^2$. The backing layer may be a spunbond or spunmelt nonwoven having a basis weight of 5 to 30 g/m$^2$. The loop layer may be superimposed face-to-face with the backing layer. The plurality of bond regions joins the loop layer to the backing layer and rendering said bond regions substantially air impermeable. The bond regions comprise between 35 to 55% of a surface area of the loop material.

20 Claims, 2 Drawing Sheets

(56) References Cited

U.S. PATENT DOCUMENTS

| | | | | |
|---|---|---|---|---|
| 7,465,366 | B2 * | 12/2008 | Provost et al. | 156/148 |
| 7,544,628 | B2 * | 6/2009 | Stupperich et al. | 442/327 |
| 2003/0077430 | A1 * | 4/2003 | Grimm et al. | 428/198 |
| 2003/0124310 | A1 * | 7/2003 | Ellis et al. | 428/138 |
| 2003/0124938 | A1 * | 7/2003 | Zafiroglu et al. | 442/328 |
| 2003/0232170 | A1 * | 12/2003 | Gillette et al. | 428/92 |
| 2004/0072491 | A1 * | 4/2004 | Gillette et al. | 442/408 |
| 2004/0123939 | A1 * | 7/2004 | Griesbach et al. | 156/164 |
| 2005/0023711 | A1 * | 2/2005 | Allen | 264/40.1 |
| 2005/0101930 | A1 * | 5/2005 | Tachauer et al. | 604/391 |
| 2005/0208259 | A1 | 9/2005 | Provost et al. | |
| 2006/0019055 | A1 * | 1/2006 | Lester et al. | 428/85 |
| 2006/0019572 | A1 * | 1/2006 | Lester et al. | 442/411 |
| 2006/0069380 | A1 * | 3/2006 | Chen et al. | 604/391 |
| 2006/0148359 | A1 * | 7/2006 | Van Gompel et al. | 442/328 |
| 2006/0154017 | A1 * | 7/2006 | Shepard et al. | 428/99 |
| 2006/0182927 | A1 * | 8/2006 | Baldauf | 428/99 |
| 2006/0217022 | A1 * | 9/2006 | Gillette et al. | 442/408 |
| 2007/0098953 | A1 * | 5/2007 | Stabelfeldt et al. | 428/100 |
| 2007/0099531 | A1 * | 5/2007 | Efremova et al. | 442/370 |
| 2007/0293835 | A1 * | 12/2007 | Roehrl et al. | 604/385.13 |
| 2010/0015386 | A1 * | 1/2010 | Baldauf et al. | 428/99 |

FOREIGN PATENT DOCUMENTS

| | | | | |
|---|---|---|---|---|
| EP | 0341993 | A1 | | 11/1989 |
| EP | 0585401 | B1 | | 3/1994 |
| EP | 585401 | B1 | * | 10/1997 |
| GB | 1589181 | A | * | 5/1981 |
| JP | 2002315607 | A | * | 10/2002 |
| JP | 2004-81254 | A | | 3/2004 |
| JP | 2004081254 | A | * | 3/2004 |
| WO | WO 2006/014127 | A1 | | 2/2006 |
| WO | WO 2006048173 | A1 | * | 5/2006 |

* cited by examiner

LOOP MATERIAL FOR LOOP AND HOOK TYPE FASTENER USED IN A DISPOSABLE ARTICLE OR GARMENT

Matter enclosed in heavy brackets [ ] appears in the original patent but forms no part of this reissue specification; matter printed in italics indicates the additions made by reissue.

*This is an application for reissue of U.S. Pat. No. 7,960,008, and is the basis of a divisional of reissue application Ser. No. 14/013,892, which is also an application for reissue of U.S. Pat. No. 7,960,008.*

RELATED APPLICATIONS

This application claims the benefit of co-pending U.S. application Ser. No. 12/060,590 filed Apr. 1, 2008 which claims the benefit of U.S. Provisional Application Ser. No. 60/912,244 filed Apr. 17, 2007. Both related applications, in their entireties, are incorporated herein by reference.

FIELD OF THE INVENTION

The present invention is directed to a loop material for a loop and hook type fastener used in a disposable article or garment.

BACKGROUND OF THE INVENTION

The use of hook and loop fastener devices in consumer and industrial applications is widely known. Examples of such applications include disposable hygiene absorbent articles such as diapers, disposable garments such as surgical gowns, and the like.

In general, a hook and loop fastener device comprises a hook component and a loop component. The hook component includes a plurality of hook-shaped members anchored to a base material. The loop component includes a plurality of upstanding loop members projecting outwardly from a backing material. The hook-shaped members are designed to engage the loop members in order to provide a strong mechanical bond there between. The hook members and the loop members can typically be engaged and disengaged repeatedly.

However, when the hook and loop fastener device is intended to be used in a disposable hygiene absorbent article or a disposable garment, a low cost loop component, which adequately functions to provide a resealable mechanical closure for a limited number of applications, is desirable. There is no need for the loop component of a disposable article to possess long term capability for repetitious engagements and disengagements with the hook component because such articles only have a short life span. However, the loop component used in conjunction with the hook component should provide a relatively high peel strength, and a relatively high shear strength, i.e. it should secure closure for a limited number of use cycles.

There are a variety of loop materials available. Typical loop materials include knit or nonwoven fabrics laminated to a layer of film for support. These loop materials are typically processed on diaper lines by unwinding the material from a roll, applying adhesive to the back, film side of the loop material, feeding the material over a perforated metal cylinder which holds the material in place with vacuum suction, cutting the material in strips as it is held against the cylinder and applying the strips to diaper backsheet material that is fed in parallel through the diaper assembly line.

Polypropylene is preferred for production of nonwoven materials for diaper applications due to their relatively low cost, soft feel, availability, and ease of processing. For nonwoven loop materials it would be desirable to eliminate the use of a film support layer in order to further reduce the cost and improve the softness and flexibility of the loop material.

However, several problems have been encountered which have limited the use of nonwovens for use as loop fastening materials. These will be discussed in turn.

Typical nonwoven materials are too air permeable. Such high permeability materials cannot be held in place effectively during the strip cutting operation on the typical existing diaper line vacuum cylinders. In order to use such highly permeable materials, extensive modification to the vacuum cylinders and associated equipment would be required.

Typical polypropylene based nonwovens are susceptible to compression. When nonwoven loop materials are wound into rolls and stored for a period of time, the loop regions can become permanently compressed. When a roll of nonwoven loop material is unwound, processed on the diaper line and pieces are cut and attached to the diaper backsheet, the loop may be so flat as to no longer to be useful as an effective fastening material.

The nonwoven fibers and filaments must be bonded together to secure the structure together as well as to leave regions of unbonded fibers or loops available for fastening with a hook counterpart. If an insufficient percentage of the planar area of the nonwoven is bonded together, nonwoven fibers can be easily pulled free from the structure upon retraction of the hook when opening the fastener. If too high a percentage of the planar area of the nonwoven is bonded together there is insufficient loop fiber available for hook engagement and the fastening performance is too low. In addition, the bonding pattern has a large impact on the ease of hook engagement and therefore the fastening performance.

There is a need for low cost nonwovens for use as a loop fastening material for use in hygiene applications such as diapers that overcome these problems.

SUMMARY OF THE INVENTION

A loop material for a hook and loop type fastener is a composite nonwoven. The composite nonwoven consists of a loop layer, a backing layer, and a plurality of bond regions. The loop layer may be a carded nonwoven of thermoplastic crimped staple fiber. The staple fiber may be between 1.5 to 6.0 dTEX. The loop layer may have a basis weight of between 10 and 35 g/m$^2$. The backing layer may be a spunbond or spunmelt nonwoven having a basis weight of 5 to 30 g/m$^2$. The loop layer may be superimposed face-to-face with the backing layer. The plurality of bond regions joins the loop layer to the backing layer and rendering said bond regions substantially air impermeable. The bond regions comprise between 35 to 55% of a surface area of the loop material.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
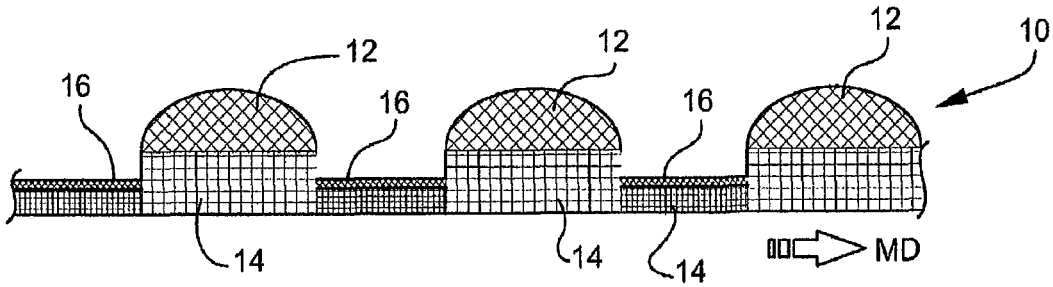
FIG. 1 is a cross sectional view of the nonwoven composite made according to the present invention.

Referring to the drawing wherein like numerals indicate like elements, there is shown in FIG. 1 an embodiment of the nonwoven composite 10. Nonwoven composite 10 includes a loop layer 12, a backing layer 14, and a plurality of bond regions 16. Each of these elements will be discussed in greater detail below.

Nonwoven composite 10 is intended to be the loop component of a hook and loop type fastener (not shown) for a disposable article/garment. Disposable article/garment includes disposable hygiene absorbent articles (such as diapers), and disposable garments (such as surgical gowns). Disposable, generally, refers to single use.

In the composite nonwoven 10, loop layer 12 and backing layer 14 are in face-to-face contact and are joined together at bond regions 16. Nonwoven composite 10 may include at least two different nonwoven materials. The loop layer 12 in the non-bonded areas forms a 'mound' whereby the loop layer nonwoven is open and adapted for hook engagement. The loop layer 12 in the bonded areas is flat whereby the loop layer is closed and not adapted for hook engagement. The total air permeability of the composite nonwoven 10 should not exceed 1500 $l/m^2/s$. In one embodiment, the permeability should not exceed 1300 $l/m^2/s$. In another embodiment, the permeability should be at 800 $l/m^2/s$. The upper limits on permeability represent a threshold where the composite nonwoven functions well in a diaper manufacturing process (as discussed above), and the lower limit represents a threshold where the composite nonwoven has sufficient suppleness (i.e., does not feel stiff like a film). Permeability is measured using an Air Permeability Tester III, Model FX 3300 from Textest AG of Zurick, Switzerland.

Loop layer 12 is adapted to, among other things, engage the hooks (not shown) of the hook and loop type fastener. In one embodiment, the loop layer 12 may be a carded nonwoven made of thermoplastic crimped staple fibers. In one embodiment, the staple fibers may have a dTEX in the range of 1.5 to 6.0. The basis weight of the carded nonwoven may be in the range of 10 to 35 $g/m^2$. Alternatively, the basis weight may be in the range of 18 to 27 $g/m^2$. Prior to its inclusion in the composite nonwoven 10, the carded nonwoven may be non-bonded (preferred) or bonded. If bonded, bonding may be accomplished by any know means (bicomponent fibers; point bonding with heat, ultrasonic, microwave; adhesives; and the like); but preferably, bonding would be accomplished by the use of bicomponent fibers. The thermoplastic, as used herein, refers to any thermoplastic material. Thermoplastic materials include, but are not limited to, polyolefins, polyesters, nylons, and combinations thereof. Polyolefins include, but are not limited to: polyethylene, polypropylene, polybutene, polymethylpentene, copolymers thereof and blends thereof. Polyesters include, but are not limited to: PET, PBT, copolymers thereof and blends thereof. In one embodiment, the thermoplastic material is polypropylene.

The backing layer 14 is adapted to, among other things, hold the fibers of the loop layer 12 in place, provide a surface so that the loop layer 12 may be secured to the article/garment (not shown), and facilitate assembly of the article/garment. In one embodiment, the backing layer may be a spunbonded or spunmelt nonwoven made of thermoplastic filaments. Spunbond or spunmelt nonwoven, as used herein, refers to a nonwoven made by a spunbond process or a spunmelt process. The spunmelt process is a combination of the spunbond (S) and meltblown (M) processes. The spunmelt nonwoven may have a structure of SM or SMS or SMMS or the like. The basis weight of the spunbonded or spunmelt nonwoven may be in the range of 5 to 30 $g/m^2$. Alternatively, the basis weight may be in the range of 11 to 17 $g/m^2$. The spunbond or spunmelt nonwoven may be adjusted to reduce air permeability. Reduced air permeability is useful in the article/garment manufacturing process when the composite nonwoven is affixed to the article/garment. The backing layer 14, when produced, may be calendered before assembly of composite nonwoven 10. After this calendering, one side may be "smooth," i.e., no dimples from the engraved roller. The smooth side may be an exposed side of the composite nonwoven 10 and may be printed thereon. The thermoplastic, as used herein, refers to any thermoplastic material. Thermoplastic materials include, but are not limited to, polyolefins, polyesters, nylons, and combinations thereof. Polyolefins include, but are not limited to: polyethylene, polypropylene, polybutene, polymethylpentene, copolymers thereof and blends thereof. Polyesters include, but are not limited to: PET, PBT, copolymers thereof and blends thereof. In one embodiment, the thermoplastic material is polypropylene.

Figure 2:
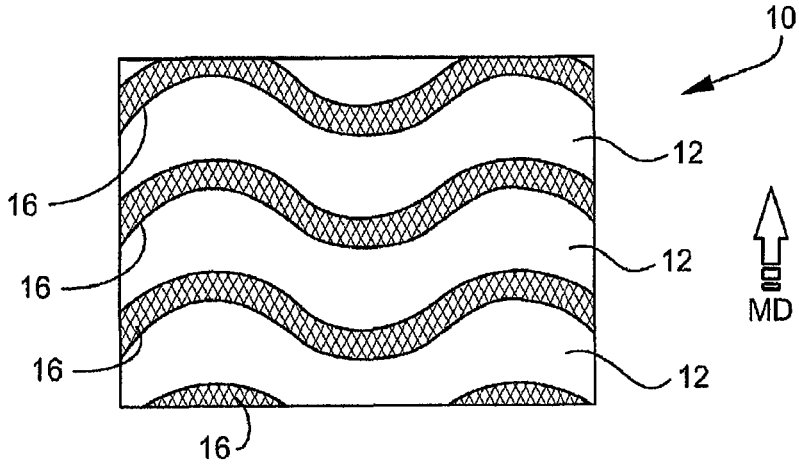
FIG. 2 is a top plan view of one of the embodiments of the nonwoven composite made according to the present invention.
Figure 3:
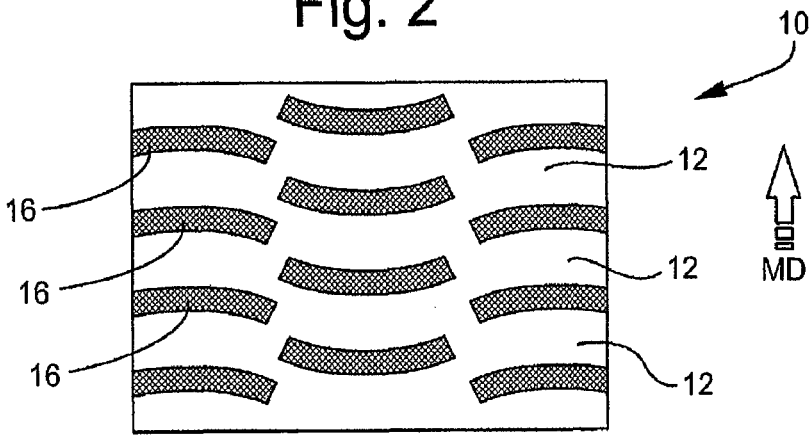
FIG. 3 is a top plan view of one of the embodiments of the nonwoven composite made according to the present invention.
Figure 4:
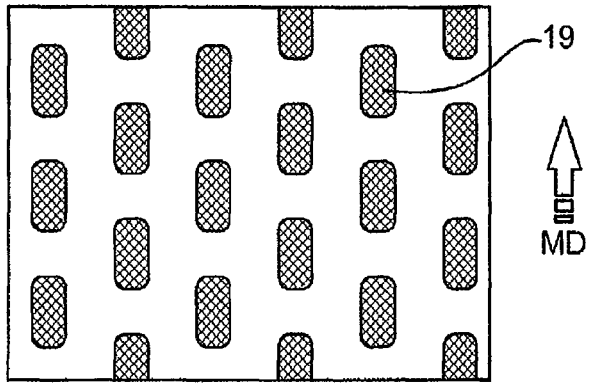
FIG. 4 is a top plan view of "islands".

Bond regions 16, as used herein, refers to the areas where the loop layer and the backing layer are joined together and where the nonwoven composite is substantially impermeable. 'Substantially impermeable' refers to the permeability relative to the non-bonded areas, where air may pass through the nonwoven composite. In the bonded areas, no air may pass (or no more than 5% of the air that would pass through the non-bonded area), whereas in the non-bonded areas air may pass through the nonwoven composite. The bond regions 16 may comprise about 35 to 55% of the surface area of the loop material. The bond regions 16 may comprise 40-50% of the surface area of the loop material. The bond regions 16 may be lines or waves (continuous or discontinuous) as illustrated, for example, in FIGS. 2, and 3; but are not "islands" 19 as illustrated, for example, in FIG. 4. In one embodiment, the bond regions are disposed in the cross machine direction. Hooks (not shown) will not engage the nonwoven composite in the bonded areas, but the hooks will engage the nonwoven composite in the non-bonded areas. As noted in FIG. 1, the combined height of the loop layer 12 and the backing layer 14 in the bonded areas is less than the height of the backing layer 14 in the non-bonded areas.

When the bond regions 16 are lines or waves, loop length is the distance between bond regions. Loop lengths in the loop material may be equal or substantially equal. Loop lengths, in the machine direction, may be 1-4 mm or 2-3 mm. The loop height is the distance between the backing layer 14 and the uppermost part of the loop layer 12. The loop height is substantially equal between non-bonded areas.

Figure 5:
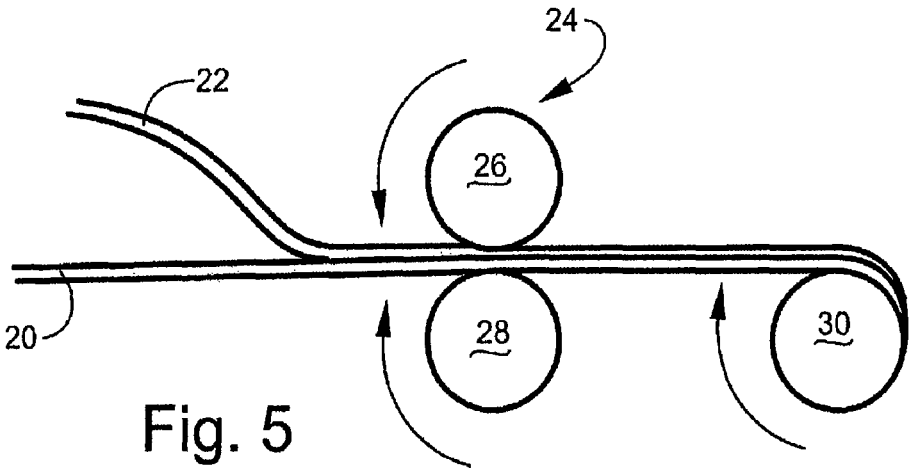
FIG. 5 is a schematic illustration of a method of manufacturing the present invention.

The composite nonwoven 10 is manufactured as follows, see FIG. 5: A first web 20, spunmelt or spunbond, is formed by extruding filaments from thermoplastic resin. This web is then consolidated by calendering. A second web 22 is produced by carding crimped staple fibers to produce a web that is not consolidated. The two webs are then superimposed (i.e., face-to-face). The resulting web composed of the two superimposed webs is passed through a hot calender 24 (roll 26 being, for example, an engraved roller, and roll 28 being, for example, a smooth roller) to achieve the following results: consolidation of the carded web by bonding the crimped staple fibers at multiple zones, joining both webs together along multiple bond zones. In the calendering process, the web bonding will be at or near the melting point of the thermoplastic polymer from which the nonwoven is produced. It is important to process at a temperature and pressure sufficient to allow the proper bonding of the webs together. Thereafter, the composite nonwoven is wound-up 30.

Example

Comparison of 180 Degree Peel Test Results

The 180 Degree Peel results are compared for composite nonwovens that were produced with a relatively low percentage of area bonding and a bonding pattern according to the present invention. Peel testing was conducted using a tensile tester, Model No. MTC Alliance RT/5 from MTS Systems Corporation of Eden Prairie, Minn.

Figure 6:
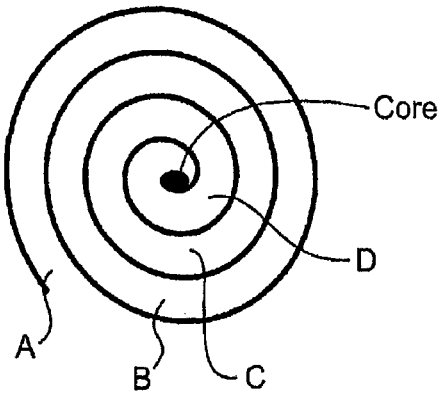
FIG. 6 is an illustration associated with the example below.

Master rolls of each composite nonwovens were produced using the bonding patterns, noted below, and then slit into rolls and wound at the same level of tension. One slit roll of each bond pattern was then stored for more than two weeks. Samples were then taken from similar sites within each roll and tested for 180 degree peel, see FIG. 6.

The 180° peel strength test involves attaching a hook component to a loop component of a hook and loop fastening system and then peeling the hook component from the loop component at a 180° angle. The maximum load needed to disengage the two components is recorded in newtons.

Slit Sample Roll 1

SMS base layer: 14 g/m$^2$
Carded fiber top layer: 23 g/m$^2$
Bonded Area: 17.4%
Engraving: Islands (See FIG. 4)
180 Degree peel test conducted with the use of Aplix 94x prototype hook (13 mm wide tape with mushroom shaped hooks with a density of 385 hooks/cm$^2$)
Samples taken from roll 17 days after slitting master roll Slit Sample Roll 2

SMS base layer: 14 g/m$^2$
Carded fiber top layer: 23 g/m$^2$
Bonded Area: 42%
Engraving: Horizontal discontinuous waves (See FIG. 3)
180 Degree peel test conducted with the use of Aplix 94x prototype hook (13 mm wide tape with mushroom shaped hooks with a density of 385 hooks/cm$^2$)

Samples taken from roll 21 days after slitting master roll

| Sample Site | Master Roll | A | B | C | D |
|---|---|---|---|---|---|
| | Slit Sample Roll 1 | | | | |
| 180° Peel, N* | 5.6 | 3.5 | 3.0 | 4.4 | 2.8 |
| | Slit Sample Roll 2 | | | | |
| 180° Peel, N* | 5.3 | 5.3 | 5.0 | 5.3 | 4.9 |

*average of ten data points

The present invention may be embodied in other forms without departing from the spirit and the essential attributes thereof, and, accordingly, reference should be made to the appended claims, rather than to the foregoing specification, as indicated the scope of the invention.

We claim:

1. A loop material for a hook and loop [type] fastener comprising: a composite nonwoven consisting of a loop layer of a non-bonded carded web of thermoplastic [crimped] staple fibers, said staple fibers being between 1.5 to 6.0 dTEX, and said carded web having a basis weight of between 10 and 35 g/m2;

a backing layer of a spunmelt nonwoven having a basis weight of 5 to 30 g/m2, said loop layer being superimposed face-to-face with said backing layer; and a plurality of bond regions joining said loop layer to said backing layer;

said composite nonwoven having an air permeability not exceeding 1500 l/m2/s.

2. The loop material of claim 1 wherein said composite nonwoven having an air permeability not exceeding 1300 l/m2/s.

3. The loop material of claim 2 wherein said composite nonwoven having an air permeability in the range of 800 to 1300 l/m2/s.

4. The loop material of claim 1 wherein said bond regions being in the form of continuous or discontinuous lines or waves.

5. The loop material of claim 4 wherein said bond regions extend in a cross machine direction.

6. The loop material of claim 1 wherein a height of said bond region being less than the height of said backing layer.

7. The loop material of claim 1 wherein said bond regions being substantially air impermeable.

8. The loop material of claim 7 wherein substantially air impermeable being an air permeability of said bond region being no more than 5% of an air permeability of a non-bond region.

9. The loop material of claim 1 wherein a plurality of loops being formed in said loop layer between said bond regions, said loops extending away from said backing layer to a substantially equal height.

10. The loop material of claim 1 wherein a loop length being a distance between bond regions, and said loop length being in the range of 1-4 mm.

11. A loop material for a hook and loop [type] fastener comprising: a composite nonwoven consisting of a loop layer of a non-bonded carded web of polypropylene [crimped] staple fibers, said staple fibers being between 1.5 to 6.0 dTEX, and said carded web having a basis weight of between 10 and 35 g/m2;

a backing layer of a polypropylene spunmelt nonwoven having a basis weight of 5 to 30 g/m2, said loop layer being superimposed face-to-face with said backing layer; and a plurality of bond regions joining said loop layer to said backing layer;

said composite nonwoven having an air permeability not exceeding 1500 l/m2/s.

12. The loop material of claim 11 where said backing layer having a basis weight of between 10 g/m2 and 14 g/m2.

13. The loop material of claim 11 where said backing layer having a basis weight of 14 g/m2.

14. The loop material of claim 11 wherein said bond regions being in the form of continuous or discontinuous lines or waves.

15. The loop material of claim 14 wherein said bond regions extend in a cross machine direction.

16. The loop material of claim 11 wherein a height of said bond region being less than the height of said backing layer.

17. The loop material of claim 11 wherein said bond regions being substantially air impermeable.

18. The loop material of claim 17 wherein substantially air impermeable being an air permeability of said bond region being no more than 5% of an air permeability of a non-bond region.

19. The loop material of claim 11 wherein a plurality of loops being formed in said loop layer between said bond regions, said loops extending away from said backing layer to a substantially equal height.

20. The loop material of claim 11 wherein a loop length being a distance between bond regions, and said loop length being in the range of 1-4 mm.

* * * * *